March 18, 1969  J. JULLIEN-DAVIN  3,433,091

DEFORMABLE CAM

Filed July 12, 1966

INVENTOR
Jean Jullien-Davin
By
Sparrow and Sparrow
ATTORNEYS

United States Patent Office 3,433,091
Patented Mar. 18, 1969

3,433,091
DEFORMABLE CAM
Jean Jullien-Davin, Valence, France, assignor to Crouzet, Valence, Drome, France, a French company
Filed July 12, 1966, Ser. No. 564,600
Claims priority, application France, July 12, 1965, 88,576
U.S. Cl. 74—568    5 Claims
Int. Cl. F16h 53/00

ABSTRACT OF THE DISCLOSURE

A deformable cam with a variable profile constructed from a plurality of adjustable screws carried by a rigid support to be used to vary the position of a control element according to a given program.

---

The invention concerns a deformable cam, i.e. a cam of variable profile to be used for instance to vary the position of a control element according to a given program.

It has already been proposed to constitute such a cam by a flexible strip fixed to a support by means of adjustable screws, disposed in groups of five so as to allow this strip to be deformed at will.

A disadvantage of a cam of this type lies in the fact that the strip comes under the control of internal forces, which variations of temperature modify in a random manner and more or less irreversible, from which it results that the profile originally formed, which is a position of equilibrium between the resilient stresses imposed by the adjustment screws and friction at point of contact, is degraded in an unforseeable manner, which takes away all the accuracy of the device, the variations of profile being much larger than simple dilations.

The invention is characterized by the improvement or modification consisting of constructing the deformable cam from a plurality of adjustable screws carried by a rigid support.

The invention will be described further, by way of example with reference to the accompanying drawings in which the cam according to the invention controls the angular position of an arm which is moved in translation by a screw whose rotation represents a given function of a variable.

Figure 1:
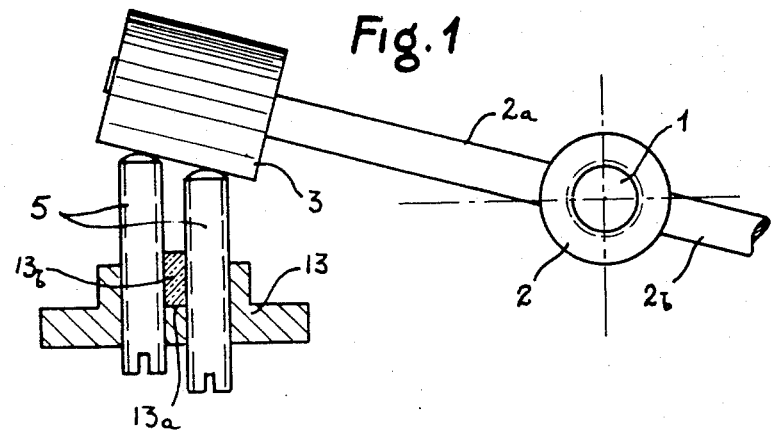
Figure 2:
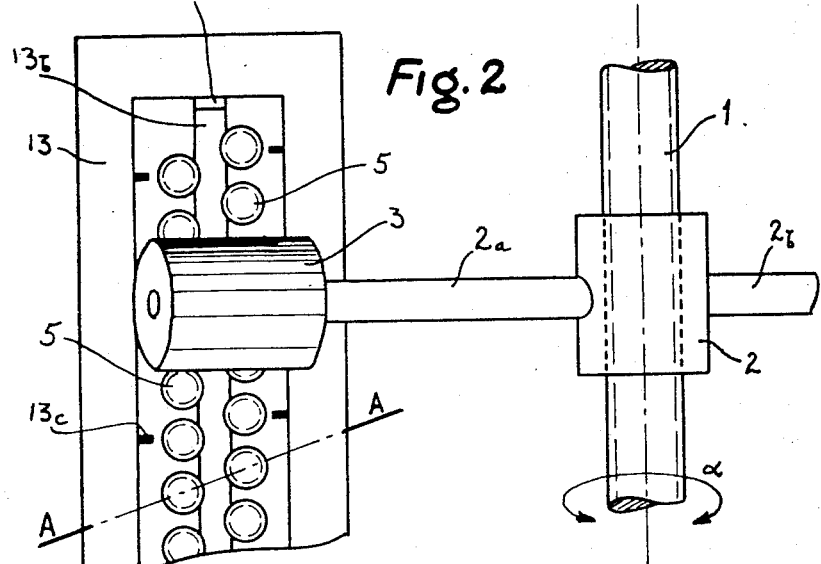

FIG. 1 is an elevation including a portion in cross-section on the line A—A of FIG. 2 of a device made in accordance with the invention;
FIG. 2 is a plan view of the device of FIG. 1; and
FIG. 3 is a side elevation of the device of FIGS. 1 and 2.

A screw 1 carries a nut 2 which is moved in translation by the rotation of said screw whose rotation represents a given function of a variable. The nut 2 is fitted with two arms 2a and 2b of which the first 2a carries on its end a cam follower 3. The second arm 2b, partially shown on FIGS. 1 and 2, is the control element which has to be actuated according to a given program. The follower 3 rolls on a cam formed by locating a plurality of screws 5 in a support. The screws 5 are adjustably carried in a support 13. The support 13 advantageously includes a groove or slot 13a of a width slightly greater than the distance which separates two rows of screws. A strip of thermoplastic material 13b is embedded in the groove 13a and is intended to retain the adjustable screws 5 in position so as to prevent accidental maladjustment during use of the device. The support 13 also includes register marks 13c engraved on one of its faces opposite some only of the screws 5. The marks may, for example, be spaced at intervals of five screws so as to facilitate the registering thereof on adjustment.

Figure 3:
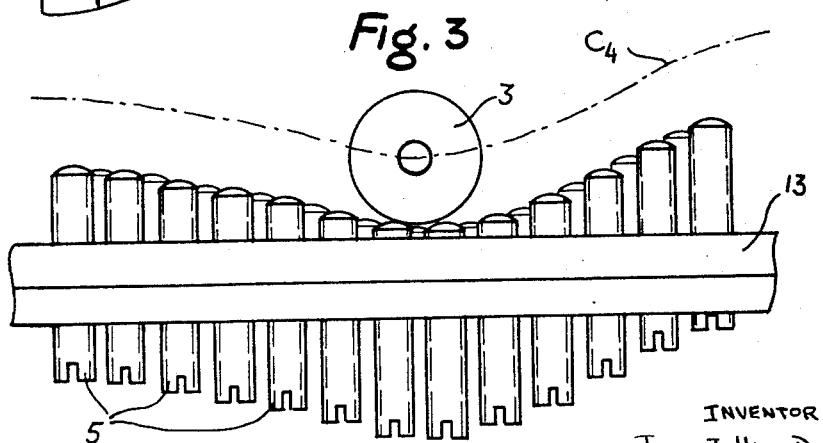

FIG. 3 shows a trajectory C4 to be described by the pivotal centre of the follower 3. The trajectory is defined by the relative positions of the ends of the screws 5 which successively form the points of contact of the follower. In this case it should be understood that the curve C4 will be composed in fact of a succession of small arcs whose lengths will define the precision of the curve obtained in relation to the ideal curve desired. In fact the precision obtained for a given length of a curve increases with the number of screws disposed in the rows, their diameter and their distance apart which increases as the number of screws increases. In addition precision increases with the number of offset rows of screws provided and also with the diameter of the follower.

Furthermore it should be understood that in this embodiment the effects of thermal dilatation on the curve defined by the track are negligible since they do not affect it as is the case with the resilient strip of the prior art since such strip is long, thin and held in a non-rigid manner.

In a preferred embodiment of the cam, the track is constituted by a double row of forty screws of 1.4 millimetres in diameter. The screws of each row are spaced apart at 1.8 millimetre centres and disposed in groups of five. The follower has a diameter of 7 millimetres and is arranged to roll on the ends of the screws. Under these conditions the cam allows for the setting up of a curve having a precision of better than 1% of the maximum amplitude displayed on the track, that is about 4 millimetres and in an ambient temperature varying from −40° C. to +80° C., the accuracy obtained is 0.2%.

What I claim is:
1. A deformable cam comprising a rigid support and a plurality of adjustable screws threaded thereto.
2. A cam as in claim 1 in which said screws are disposed in at least one row around said support.
3. A cam as in claim 1 in which said screws are set in at least two parallel spaced-apart rows around said support, said screws of one row being offset relative to said screws of said other rows.
4. A cam as in claim 3 and grooves in said support between adjacent rows of screws, said grooves being wider than the spacing of said rows of screws, a strip of plastic material in each of said grooves arranged to trap said screws and lock them against movement.
5. A cam as in claim 4 in which said support is engraved at positions regularly spaced-apart on its surface and opposite to pre-selected screws.

References Cited

UNITED STATES PATENTS

| | | | |
|---|---|---|---|
| 895,722 | 8/1908 | Bungeroth | 74—568 |
| 2,771,250 | 11/1956 | Icenbice | 74—568 |
| 2,799,171 | 7/1957 | Stibitz | 74—54 |
| 2,900,837 | 8/1959 | Brandt | 74—568 |
| 3,158,121 | 11/1964 | Brems. | |
| 3,264,897 | 8/1966 | Berger | 74—568 |

FRED C. MATTERN, Jr., *Primary Examiner.*
F. D. SHOEMAKER, *Assistant Examiner.*

U.S. Cl. X.R.
339—130